United States Patent [19]

Fujii et al.

[11] 4,166,523

[45] Sep. 4, 1979

[54] HYDRAULIC SHOCK ABSORBER FOR VEHICLES

[75] Inventors: Katsuhiko Fujii; Hitoshi Nakano, both of Niiza; Tetsuro Mitsui, Shiki, all of Japan

[73] Assignee: Honda Giken Kogyo Kabushiki Kaisha, Tokyo, Japan

[21] Appl. No.: 878,947

[22] Filed: Feb. 17, 1978

[30] Foreign Application Priority Data

Feb. 22, 1977 [JP] Japan .............................. 52-20486[U]

[51] Int. Cl.² .............................................. F16F 9/36
[52] U.S. Cl. ........................................ 188/322; 277/70
[58] Field of Search ................. 277/70; 188/266, 298, 188/322, 318; 267/64 R; 308/184 R, 238

[56] References Cited

U.S. PATENT DOCUMENTS

| | | | |
|---|---|---|---|
| 3,203,511 | 8/1965 | Long | 188/322 X |
| 3,955,859 | 5/1976 | Stella et al. | 277/70 X |
| 3,999,743 | 12/1976 | Mahoff | 188/322 X |
| 4,005,769 | 2/1977 | Itoh | 188/322 X |

*Primary Examiner*—Duane A. Reger
*Attorney, Agent, or Firm*—Irving M. Weiner; Pamela S. Austin; Melvin Yedlin

[57] ABSTRACT

A hydraulic shock absorber for vehicles wherein an elastic body tightens the outer periphery of piston rod so that the piston rod floats, and noises and vibrations are reduced to be as low as possible.

17 Claims, 16 Drawing Figures

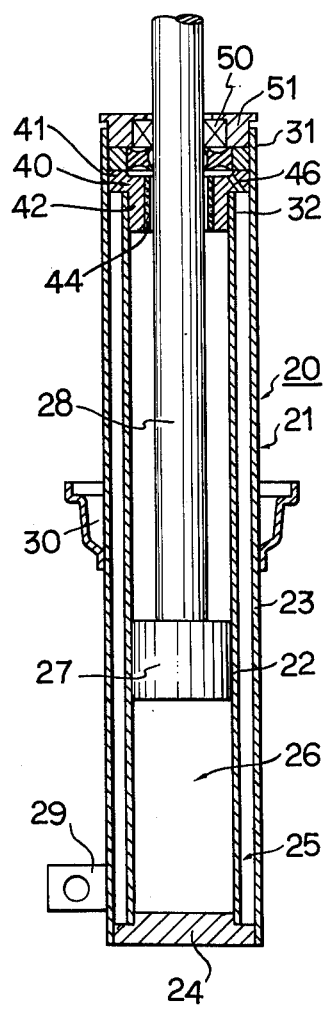
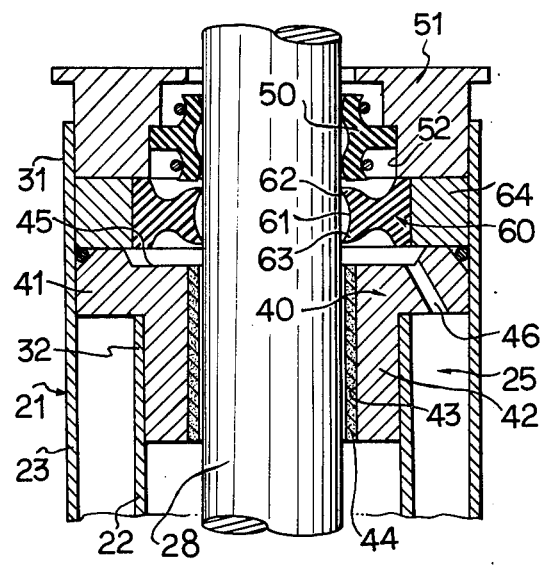
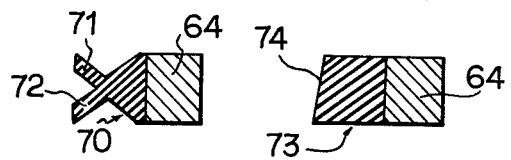
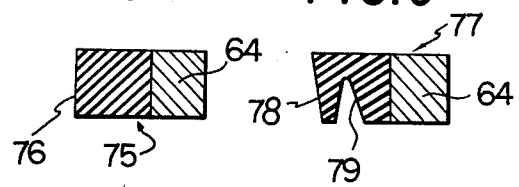
FIG.1  FIG.2  FIG.3  FIG.4  FIG.5  FIG.6

HYDRAULIC SHOCK ABSORBER FOR VEHICLES

BACKGROUND OF THE INVENTION

1. Field of the Invention

The present invention relates to improvements in a hydraulic shock absorber for vehicles wherein a piston reciprocates in a cylinder to generate an oil pressure attenuating force and absorb shocks.

More particularly, the invention relates to a hydraulic shock absorber for vehicles wherein an elastic body tightening the outer periphery of a piston rod is provided in a piston rod guide part so that the outer periphery of the rod is supported by this elastic body so as to float. Also, the noises at the time of the shock absorbing operation, particularly the shock noises generated by an increase in the hydraulic pressure, and the friction noises of the rod and rod guide part and the vibration and shock noises, are reduced to be as low as possible. The operation is quiet, and the vibrations and noises are few.

2. Description of the Prior Art

There is known a hydraulic shock absorber for vehicles wherein oil is put in a cylinder, a piston is slidably fitted in this cylinder, the cylinder is secured to the wheel, and the piston is secured to the vehicle body so that the shock received by the wheel is absorbed by the hydraulic shock absorbing action between the wheel and the vehicle body.

In this kind of shock absorber, for example, a shock absorber of a McPherson type is formed as follows. The shock absorber is utilized as a part of a suspending link, the lower part of the cylinder is fitted to the wheel, and the upper end of the piston rod is fitted to the body so that the shock absorber is arranged on an incline. Because the shock absorber is provided diagonally, with the upper end of the piston rod directed inwardly and with the lower part of the cylinder directed outwardly, and is used as a suspending link, not only the load in the vertical direction, i.e., the reciprocating direction of the piston, but also the side force will act on the cylinder. As a result, a bending force will act on the piston rod.

In such a shock absorber, the piston rod is supported at its lower end by the sliding surface of the cylinder with the piston, and at its upper end by a rod guide. The rod guide functions as a bearing for the rod. Therefore, the bearing, such as of a synthetic resin, is provided on the inner periphery of the rod guide to guarantee smooth sliding of the rod.

Generally, a slight clearance is formed between the inner periphery of this rod guide and the outer periphery of the rod. This clearance is necessarily formed due to the problem of precision in manufacture, and the fluctuation of the products. But, on the other hand, if the precision is increased and the clearance between the inner periphery of the rod guide and the outer periphery of the rod is made very slight, the friction between them will increase. Thus, the smooth sliding of the rod and the shock absorbing performance will be impeded.

Therefore, in this kind of shock absorber, it is desirable to form a slight clearance between the piston rod and the rod guide of the cylinder, and some clearance is even necessary for the smooth reciprocation to properly perform the shock absorbing function.

However, in such shock absorbers, the presence of a clearance between the piston rod and rod guide produces the following problems.

The noise of the shocks of the internal hydraulic pressure and shocks by the frictional vibrations at the time of the shock absorbing operation will pass out through such a clearance. By the action of the side force, the piston rod will be bent and will contact the guide to generate vibration that will be transmitted to the vehicle body. Therefore, as a measure of preventing noises and vibrations, an improvement to avoid such problems is greatly desired.

SUMMARY OF THE INVENTION

The invention provides a hydraulic shock absorber for a vehicle, provided with a cylinder having at least a portion thereof supported by a wheel of the vehicle. A piston is slidably disposed in the cylinder, and a hydraulic pressure chamber is disposed in the cylinder between at least one end of the piston and a closed portion of the cylinder. A piston rod is movable with the piston and extends out of at least one end of the cylinder. The piston rod has at least a portion thereof supported by a portion of the body of the vehicle. A rod guide is disposed between the piston rod and the cylinder to guide the piston rod. An elastic body is disposed near the rod guide for tightening, enclosing and supporting at least a portion of the outer periphery of the piston rod.

An object of the invention is to provide a hydraulic shock absorber for vehicles wherein an elastic body is provided to tighten the outer periphery of a piston rod in a rod guide part so that the outer peripheral part of the rod is supported by this elastic body so as to float.

Another object is to provide a hydraulic shock absorber for vehicles wherein the outer periphery of the piston rod is elastically supported by the tightening with such elastic body, and the clearance normally present between the inner periphery of the rod guide and the outer periphery of the rod is eliminated as much as possible so that the internal noises of the shock absorber are intercepted and are prevented from leaking out, and thus the operation is quiet.

An additional object is to provide a hydraulic shock absorber for vehicles wherein by contact of the rod with the inner periphery of the rod guide caused by radial vibrations of the piston rod by hydraulic shocks, frictional vibrations, and side force fluctuations is prevented as much as possible. Also, generation of noises is prevented. Further, the transmission of vibrations to the vehicle body is also prevented by the vibration absorbing action of the elastic body. The operation is quiet, and virtually vibration-free.

A further object is to provide a hydraulic shock absorber for vehicles wherein the structure is so simple as to provide an elastic body to tighten the outer periphery of the piston rod in the rod guide part so that noises and vibrations can be effectively prevented, without making any major modification of an existing shock absorber.

Concretely, the invention provides a hydraulic shock absorber for vehicles wherein a rod tightening elastic body is provided between a rod guide and an oil seal part provided on it. The elastic body is supported in its outside diameter part by a ring-shaped hard supporting mother body, and is only interposed between the rod guide and oil seal part of an existing hydraulic shock absorber to effectively attain the above-mentioned objects.

Also, the invention provides hydraulic shock absorbers for vehicles wherein a seal piece supporting the seal member forming the oil seal part is also the supporting mother body of the elastic body so that the structure of the elastic body is simplified.

Further, the invention provides a hydraulic shock absorber wherein the elastic body is made of synthetic resin having a low coefficient of friction, and is easily flexed in its inside diameter part. The elastic body is made of rubber or the like in its outside diameter part, and is formed to be elastically tightened and fastened radially inwardly so that noises and vibrations are effectively prevented, and the smooth sliding of the rod is guaranteed. The above elastic body may be provided above the rod guide.

Also, the invention provides a hydraulic shock absorber wherein an elastic body is provided below the rod guide to tighten the rod so that the rod is supported before the rod guide so as to float.

The invention obtains a hydraulic shock absorber including a piston rod tightening elastic supporting structure wherein elastic bodies are provided above and below the rod guide part.

The elastic body may be made integral with the rod guide, and may tighten the rod in the inside diameter part of a guide hole in the rod guide made of a hard member. The elastic body may be made of an elastic member on its outside diameter side, and of a synthetic resin having a low coefficient of friction on its inside diameter side. The elastic body may be formed to contract elastically radially inwardly to be tightened, and tightens and supports the rod so as to float with the rod guide itself to attain the above-mentioned objects.

BRIEF DESCRIPTION OF THE DRAWINGS

FIG. 1 shows a fundamental structure of the invention, and is an explanatory vertically sectioned side view showing the scheme of a hydraulic shock absorber.

FIG. 2 is a magnified vertically sectioned view of a first embodiment including a rod guide part.

FIGS. 3 to 6 are magnified vertically sectioned partial views showing different kinds of elastic bodies.

DETAILED DESCRIPTION

Figure 7:
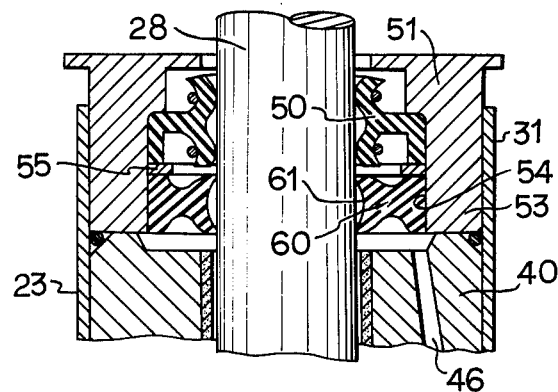
FIG. 7 is a view showing a modified embodiment of FIG. 2.

FIGS. 1 to 6 show the fundamental structure and first embodiment of the hydraulic shock absorber according to the present invention.

A cylinder 21 of a hydraulic shock absorber 20 is formed of double inside and outside cylinders 22 and 23 closed in the bottom with a bottom member 24. The space between cylinders 22 and 23 is made a reservoir chamber 25. A hydraulic pressure generating chamber 26 sectioned from chamber 25 is provided within inside cylinder 22. Chambers 25 and 26 communicate with each other through a passage or check valve (not illustrated) provided in member 24.

A piston 27 is slidably fitted within cylinder 22 and is provided with an orifice and check valve (not illustrated). A piston rod 28 is extended out axially upward from the center of piston 27, and is extended out in its upper part axially outward of the upper end of cylinder 21.

A bracket 29, to secure cylinder 21 to a wheel of a vehicle, is provided on a part of the outer periphery of the lower part of cylinder 21. A spring receiver 30, to support the other end of a return spring, consisting of a coil spring or the like and supported at one end on the vehicle body side, is provided in the intermediate part of the outer preiphery of cylinder 21.

A rod guide 40, which is simultaneously a spacer member for positioning the upper ends of cylinders 22 and 23, is fitted to the upper end of cylinder 21 and is provided with a large diameter part 41 and a small diameter part 42. Part 41 is fitted to the inner periphery of the upper end part 31 of outside cylinder 23, and part 42 is fitted to the inner periphery of the upper end part 32 of cylinder 22 to fix cylinders 22 and 23 concentrically in predetermined positions by keeping a predetermined clearance between them.

A through guide hole 43 to vertically pass the rod 28 is formed in the center part of guide 40, and has a diameter larger than the outside diameter of rod 28. A bush 44, which is a bearing member and may be made of a synthetic resin, is integrally fitted in hole 43. A slight clearance is provided between bush 44 and rod 28. Bush 44 is made preferably, for example, of Teflon TFE (a trademark of Dupont, U.S.A.) which is low in friction coefficient and high in heat-proofness, wear-resistance and mechanical strength.

A dish-shaped recess 45 is made on the upper surface of guide 40 to retain oil leaking through and between bush 44 and rod 28. An oil passage 46 is provided in part 41 in the end of recess 45 to return the leaking oil to reservoir chamber 25.

A ring-shaped oil seal member 50 is provided in the upper end part of cylinder 23 above guide 40 to seal the outer periphery of rod 28 and to prevent oil from leaking out. Seal 50 is held by a ring-shaped seal piece 51 provided in the upper end part of cylinder 23, and is locked with a recessed step part 52 provided in the inside diameter part of seal piece 51.

Guide 40 and seal member 50 including the seal piece 51 are axially separated from each other, and an elastic body 60 is interposed between them.

Body 60 is formed of elastic material such as rubber or a synthetic resin such as Nylon (a trademark of DuPont, U.S.A.). Body 60 has an elasticity and rigidity greater than the tightening force of member 50, and is ring-shaped. The inside diameter part 61 of body 60 is set to be smaller by a predetermined diameter than the outside diameter of rod 28 so that there may be some interference with rod 28.

In the illustrated embodiment, the outer periphery of body 60 is held by a retainer 64, made of metal or the like, and is secured, by baking or the like, to the inner periphery of retainer 64. Lip parts 62 and 63 are formed in the upper and lower parts of part 61 by curving their cross-section in the outside diameter direction. Lip parts 62 and 63 contact the outer periphery of rod 28 to elastically fasten and tighten it, and tighten and support the entire outer periphery of rod 28 to keep a clearance between the inner periphery of bush 44 and the outer periphery of rod 28.

As shown in FIGS. 3 to 6, various types can be adopted for the cross-sectional shape of the elastic body.

Elastic body 70 shown in FIG. 3 has a structure in which lip-shaped lip parts 71 and 72 are provided in the inside diameter part, and the outside diameter part is held by retainer 64. Elastic body 73 shown in FIG. 4 is of a type in which the inside diameter part 74 is female-tapered as projected at an obtuse angle toward rod 28 to reduce the diameter of the lower part of part 74. Elastic body 75 shown in FIG. 5 is of a type in which the inside diameter part 76 is made parallel with the outer periphery of rod 28. Elastic body 77 shown in FIG. 6 is of a type in which the inside diameter part 78 is made to project in the upper part in the inside diameter direction, and is made easy to flex by providing an incision 79 in its bottom. Any suitable elastic body, including the above, may be selected and used.

FIG. 7 shows a modified embodiment of the first embodiment.

In this embodiment, the retainer 64 which is the elastic body 60 holding member is removed, and the body 60 is held by a seal piece 51 instead of retainer 64.

The lower part of seal piece 51 supporting the oil seal member 50 is extended. The elastic body 60 is fitted in the inside diameter part 54 of the lower part of the extension 53. The outer periphery of rod 28 is tightened, fastened and supported by the inside diameter part 61 of body 60. Member 50 is provided above body 60. A ring-shaped spacer 55 is interposed between member 50 and body 60. Rod 28 is tightened and supported below spacer 55, and is oil-sealed above it.

Thus, without using a retainer, body 60 may be supported with the seal piece supporting the oil seal member.

As in the above, body 60 is interposed between guide 40 and member 50 so that rod 28 is held in the center position by the elastic tightening and fastening of body 60 so as to float.

The clearance between the inner periphery of bush 44 and the outer periphery of rod 28 will be closed by the inside diameter part of body 60 located above. Therefore, the noises of the hydraulic shocks and shocks and vibrations caused by the sliding friction of the piston will be transmitted out through rod 28, but will be attenuated and reduced to be as low as possible by body 60 because rod 28 is supported to be tightened and fastened by body 60 above the guide 40. Due to the vibrations by the hydraulic shocks, the vibrations by the friction at the time of sliding of the piston, and the fluctuations of the side force in addition, vibrations in the radial direction will be generated in rod 28. By the bend of rod 28 by the side force together with them, the rod 28 will tend to contact the inside diameter part of bush 44. However, under such condition, body 60 will act to hold rod 28 in the center position by the tightening, and will prevent the contact with the bush as much as possible. Body 60 will also inhibit and prevent as much as possible the generation of vibrations from being transmitted to the vehicle body side.

In case the rod is bent by the side force with only an elastic body, the deformation, sliding resistance and wear of the elastic body will be problems. However, with the present invention, even if the elastic body 60 is worn a little, there will be no influence at all on the inherent shock absorbing function.

Figure 8:
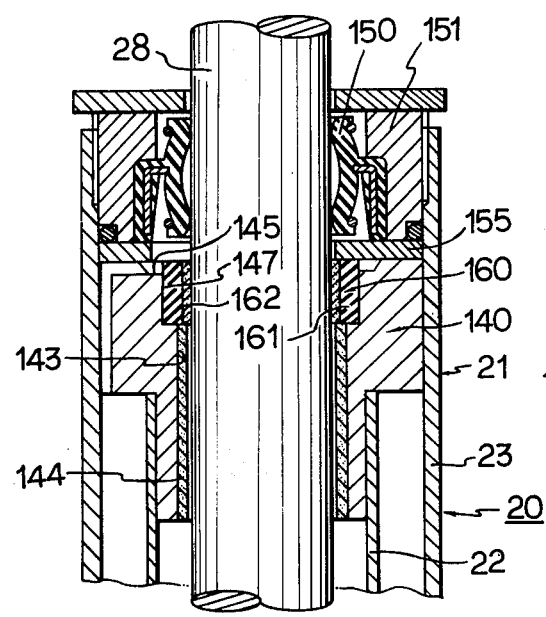
FIG. 8 is a vertically sectioned view showing the essential part of a second embodiment.
Figure 9:
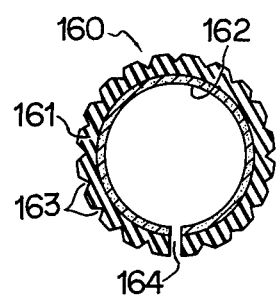
FIG. 9 is a sectioned plan view of the elastic body used in FIG. 8.
Figure 10:
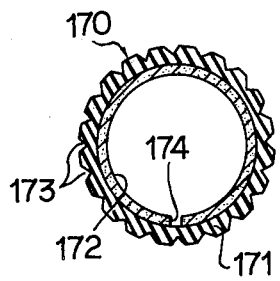
FIG. 10 is a view of a modified embodiment of FIG. 9.

FIGS. 8 to 10 show the second embodiment.

In this embodiment, a bush 162 made of synthetic resin, such as Teflon, is integrally provided on the inner periphery of an elastic body 160 performing also a sealing action, preventing the leakage of the internal oil, and doubly performing the oil sealing action together with a sealing member 150.

Body 160 consists of an outside diameter side body 161 made of a nitrile rubber or the like in its outer periphery, and an inside diameter member 162 on the inside diameter side made of a bush of Teflon or the like. Member 162 is integrally secured by baking or the like to the inner periphery of body 161. As shown in FIG. 9, incisions 163 are radially provided on the outer periphery of member 161 to make flexing it in the inside diameter direction easy in consideration of tightening it and pressing it into the rod guide. A part of the same part of members 162 and 161 is cut off to secure a fastening flexure 164 at the time of tightening body 160.

In body 160, the outside diameter is smaller than in the first embodiment, and no retainer is provided. Body 160 is supported as follows.

An annular recessed step part 147, of such depth as substantially half the body 160, is provided in the upper part of a through part 143 fitted with a bush 144 on the upper surface of rod guide 140. Body 160 is forcibly fitted and pressed into step part 147. Body 160 projects above step part 147 to be present in the dish-shaped recess 145. The top of body 160 is made flush with the upper surface of guide 140. A ring-shaped spacer 155 is provided between body 160 and an oil seal member 150 and seal piece 151 provided above it.

Because member 162 which is a bush of body 160 is cut off together with member 161 to provide a fastening flexure 164, the members 161 and 162 tighten and fasten the outer periphery of rod 28 and act as mentioned above. Because member 162 is formed of a synthetic resin that is low in friction coefficient, such as Teflon, even if rod 28 is tightened and supported, the friction-resistance will be as low as possible, and rod 28 will be able to smoothly slide while being tightened and supported. In the same manner as mentioned above, the leakage of internal shock noises and vibrations, the transmission of vibrations to the vehicle body, and contact with the rod guide by vibrations are prevented.

The body may also be made an elastic body 170 of the type shown in FIG. 10.

An outside diameter member 171, provided with incisions 173 on its outer periphery, has a continuous ring-shape. A part of an inside diameter member 172 is cut off to provide a fastening flexure 174. Body 170 will be suitable because rubber or the like is a flexible elastic material.

Figure 11:
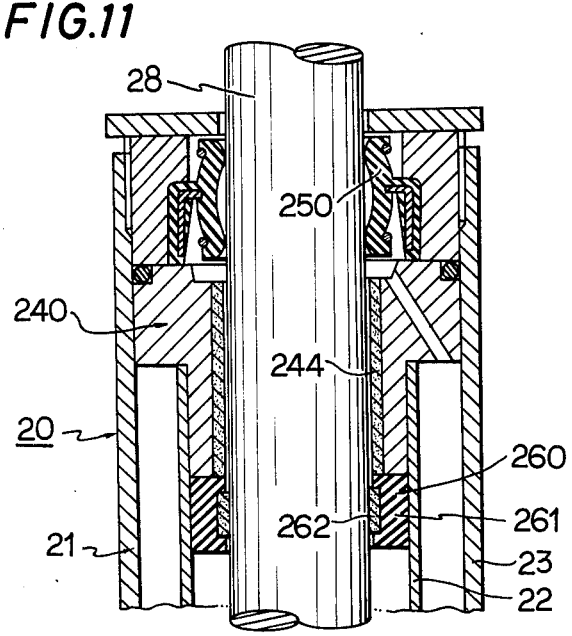
FIG. 11 is a vertically sectioned view showing the essential part of a third embodiment.
Figure 12:
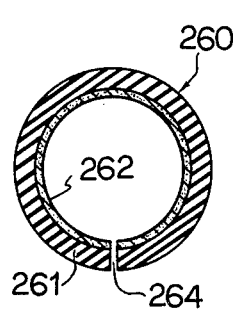
FIG. 12 is a sectioned plan view of the elastic body used in FIG. 11.
Figure 13:
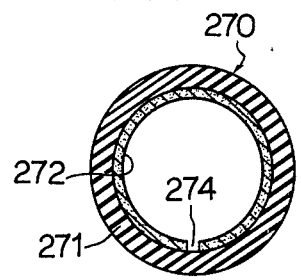
FIG. 13 is a view of a modified embodiment of FIG. 12.

FIGS. 11 to 13 show a third embodiment.

This embodiment is a modified embodiment of the second embodiment, and has an elastic body 260 provided at the lower end of rod guide 240.

Body 260 consists of an inside diameter member 262 consisting of a bush, made of Teflon or the like, and an outside diameter member 261 made of a nitrile rubber or the like. Member 262 is thinner than member 261, and is integrally embedded in the central inside diameter part of member 261 so as to radially half sink. As shown in FIG. 12, the same part of members 262 and 261 is cut off to provide a fastening flexure 264.

Body 260 is forcibly fitted and pressed into cylinder 22 below guide 240. Body 260 is contacted at its upper end by the lower end of guide 240 to tighten and fasten the outer periphery of rod 28 with body 260. Rod 28 is supported on this part by body 260, and is vertically passed through a bush 244 of guide 240, and is extended out through an oil seal member 250.

FIG. 13 shows a modified embodiment of the elastic body. An elastic body 270 is ring-shaped with a continuous outside diameter member 271, and only a part of an inside diameter member 272 is cut to be a fastening flexure 274. Body 270 is suitable because a rubber or the like is a flexible elastic material.

Figure 14:
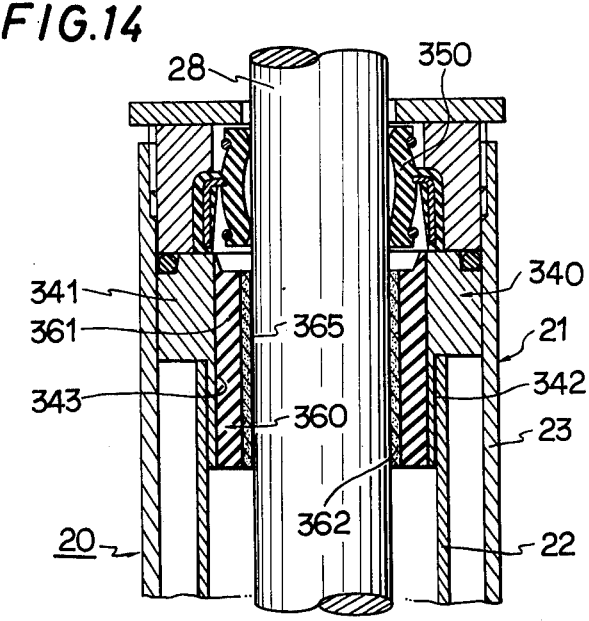
FIG. 14 is a vertically sectioned view showing the essential part of a fourth embodiement.
Figure 15:
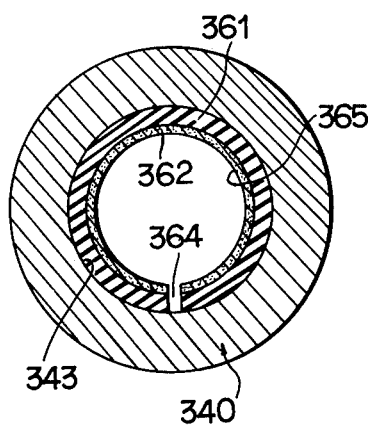
FIG. 15 is a sectioned plan view of the elastic body used in FIG. 14.
Figure 16:
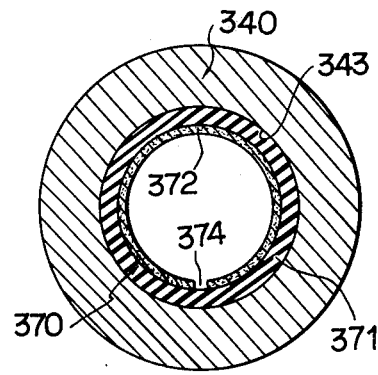
FIG. 16 is a view of a modified embodiment of FIG. 15.

FIGS. 14 to 16 show a fourth embodiment.

In each of the other embodiments, the elastic body is formed quite separately from the rod guide, and is provided above or below the rod guide so as to tighten and support the rod. But in the fourth embodiment, the elastic body is made integral with the rod guide.

A rod guide 340 has fundamentally the same structure as of the other embodiments, and is formed of metal or the like. The inner peripheral parts of the upper ends of cylinders 23 and 22 are contacted and supported by a large diameter part 341 and small diameter part 342 to be positioned and fixed. A vertical through hole 343, provided in guide 340, has a large diameter to maintain a clearance between it and the outer periphery of rod 28.

An elastic body 360 is forcibly fitted, pressed and fixed in hole 343. Body 360 has an inside diameter member 362 consisting of a bush made of a synthetic resin low in friction coefficient such as Teflon, and an outside diameter member 361 made of a nitrile rubber or the like. Member 362 is integrally connected by baking or the like to the inner periphery of member 361. Body 360 is provided over substantially the entire length of hole 343 so that rod 28 vertically passes through the inside diameter part 365 of member 362 and is supported by the tightening and fastening action of body 360. Rod 28 is tightened and supported over substantially the entire length of guide 340 but, with the inside diameter member 362 as mentioned above, the axial reciprocation will be made smoothly, and the upper part of guide 340 including body 360 will be sealed with an oil seal member 350.

As shown in FIG. 15, body 360 is fitted in hole 343, and the same part of members 362 and 361 is cut off to provide a fastening flexure 364.

As shown in FIG. 16, there may be used an elastic body 370 in which an outside diameter member 371 is continued ring-shaped, and a part of an inside diameter member 372 is cut off to provide a fastening flexure 374.

Thus, the rod guide may form an elastic body and the rod may be elastically tightened and supported with the rod guide itself, and may be supported to float so that the effect of preventing noises and vibrations can be attained.

We claim:

1. A hydraulic shock absorber for a vehicle, comprising:
    a cylinder having at least a portion thereof supported by a wheel of said vehicle;
    a piston slidably disposed in said cylinder;
    a hydraulic pressure chamber disposed in said cylinder between at least one end of said piston and a closed portion of said cylinder;
    a piston rod movable with said piston and extending out of at least one end of said cylinder;
    said piston rod having at least a portion thereof supported by a portion of the body of said vehicle;
    a rod guide disposed between said piston rod and said cylinder to guide said piston rod;
    an elastic body disposed proximal said rod guide for tightening, enclosing, and supporting at least a portion of the outer periphery of said piston rod;
    the respective ends of said cylinder and rod being supported on the wheel side and vehicle body side so that vibrations and shocks from said wheel are absorbed by the oil pressure generated within said cylinder by sliding of said piston including said rod;
    said elastic body being adapted to elastically tighten said outer periphery of said rod so as to enclose, tighten and support the outer peripheral part of said rod;
    an oil seal member being provided above said rod guide around said rod;
    said elastic body being provided between the upper part of said rod guide and the lower part of said oil seal member provided above said rod guide; and
    said elastic body being adapted to tightly support said piston rod in a center position with substantially greater elasticity and rigidity than the tightening force of said oil seal member.

2. A shock absorber according to claim 1, wherein:
    said elastic body is formed of rubber or a synthetic resin having a flexible elasticity;
    said outer periphery of said rod is tightened with the inside diameter part of said elastic body;
    the outside diameter part of said elastic body is supported with a hard ring-shaped member; and
    said ring-shaped member is supported between the upper part of said rod guide and a seal piece of said oil seal member.

3. A shock absorber according to claim 1, wherein:
    the inside diameter part of said elastic body is formed to be easy to flex so as to flexibly and elastically tighten said outer peripheral part of said rod.

4. A shock abosrber according to claim 1, wherein:
    said elastic body is provided below the inside diameter part of a seal piece of said oil seal member to tighten and support said rod above said rod guide; and
    said oil seal member is provided above and sectioned from said inside diameter part of said seal piece above said elastic body.

5. A hydraulic shock absorber for a vehicle, comprising:
    a cylinder having at least a portion thereof supported by a wheel of said vehicle;
    a piston slidably disposed in said cylinder;
    a hydraulic pressure chamber disposed in said cylinder between at least one end of said piston and a closed portion of said cylinder;
    a piston rod movable with said piston and extending out of at least one end of said cylinder;
    said piston rod having at least a portion thereof supported by a portion of the body of said vehicle;
    a rod guide disposed between said piston rod and said cylinder to guide said piston rod;
    an elastic body disposed proximal said rod guide for tightening, enclosing, and supporting at least a portion of the outer periphery of said piston rod;
    the respective ends of said cylinder and rod being supported on the wheel side and vehicle body side so that vibrations and shocks from said wheel are absorbed by the oil pressure generated within the cylinder by sliding of said piston including said rod;

said elastic body being adapted to elastically tighten said outer periphery of said rod so as to enclose, tighten and support the outer peripheral part of said rod; and said elastic body being provided above said rod guide so as to tighten and support said outer periphery of said rod, and being formed of an elastic outer diameter member, and an inside diameter member made of a synthetic resin having a low coefficient of friction.

6. A shock absorber according to claim 5, wherein:
said outer diameter member is formed of rubber; and
said elastic body is integrally fitted to a circular recess provided in the central part of the upper part of said rod guide.

7. A shock absorber according to claim 5, wherein:
a plurality of incisions are radially provided on the outer periphery of said outside diameter member of said elastic body so that said elastic body is easy to flex.

8. A shock absorber according to claim 5, wherein:
a part of the same portion of said outside diameter member and of said inside diameter member of said elastic body is cut off to provide a fastening flexure.

9. A shock absorber according to claim 5, wherein:
said outside diameter member of said elastic body is formed to have continuous ring-shape; and
a part of said inside diameter member is cut off to provide a fastening flexure.

10. A hydraulic shock absorber for a vehicle, comrising:
a cylinder having at least a portion thereof supported by a wheel of said vehicle;
a piston slidably disposed in said cylinder;
a hydraulic pressure chamber disposed in said cylinder between at least one end of said piston and a closed portion of said cylinder;
a piston rod movable with said piston and extending out of at least one end of said cylinder;
said piston rod having at least a portion thereof supported by a portion of the body of said vehicle;
a rod guide disposed between said piston rod and said cylinder to guide said piston rod;
an elastic body disposed proximal said rod guide for tightening, enclosing, and supporting at least a portion of the outer periphery of said piston rod;
the respective ends of said cylinder and rod being supported on the wheel side and vehicle body side so that vibrations and shocks from said wheel are absorbed by the oil pressure generated within the cylinder by sliding of said piston including said rod;
said elastic body being adapted to elastically tighten said outer periphery of said rod so as to enclose, tighten and support the outer peripheral part of said rod; and
said elastic body being provided below said rod guide to tighten and support the outer periphery of said rod, and being formed by an elastic outside diameter member made of rubber and an inside diameter member made of a synthetic resin having a low coefficient of friction.

11. A shock absorber according to claim 10, wherein:
a recess is provided in the inside diameter portion of said outside diameter member of said elastic body; and
said inside diameter member is provided to be half sunk in said recess.

12. A shock absorber according to claim 11, wherein:
a part of the same portion of said outside diameter member and of said inside diameter member of said elastic body is cut off to provide a fastening flexure.

13. A shock absorber according to claim 10, wherein:
said outside member of said elastic body is formed to have a continuous ring-shape; and
a part of said inside diameter member is cut off to provide a fastening flexure.

14. A hydraulic shock absorber for a vehicle, comprising:
a cylinder having at least a portion thereof supported by a wheel of said vehicle;
a piston slidably disposed in said cylinder;
a hydraulic pressure chamber disposed in said cylinder between at least one end of said piston and a closed portion of said cylinder;
a piston rod movable with said piston and extending out of at least one end of said cylinder;
said piston rod having at least a portion thereof supported by a portion of the body of said vehicle;
a rod guide disposed between said piston rod and said cylinder to guide said piston rod;
an elastic body disposed proximal said rod guide for tightening, enclosing, and supporting at least a portion of the outer periphery of said piston rod;
the respective ends of said cylinder and rod being supported on the wheel side and vehicle body side so that vibrations and shocks from said wheel are absorbed by the oil pressure generated within the cylinder by sliding of said piston including said rod;
said elastic body being adapted to elastically tighten said outer periphery of said rod so as to enclose, tighten and support the outer peripheral part of said rod; and
a vertical through hole of said rod guide being formed to be of a diameter larger than the outside diameter of said piston rod; and
said elastic body being fitted over substantially the entire length of said through hole to tighten and support the outer periphery of said rod in the rod guide part.

15. A shock absorber according to claim 14, wherein:
said elastic body is formed of an elastic outside diameter member, and an inside diameter member made of a synthetic resin having a low coefficient of friction; and
said outside diameter member is fitted in said vertical through hole of said rod guide.

16. A shock absorber according to claim 15, wherein:
said elastic outside diameter member is formed of rubber; and
a part of the same portion of said outside diameter member and of said inside diameter member of said elastic body is cut to provide a fastening flexure.

17. A shock absorber according to claim 15, wherein:
said outside diameter member of said elastic body is made cylindrical to have a continuous ring-shape; and
a part of said inside diameter member is cut off to provide a fastening flexure.

* * * * *